United States Patent [19]

LeGrand et al.

[11] Patent Number: 4,571,280

[45] Date of Patent: Feb. 18, 1986

[54] METHOD FOR INCREASING THE ADHESION OF POLYDIORGANOSILOXANE-POLYCARBONATE BLOCK COPOLYMER INTERLAYERS TO ADJOINING LAMINAE AND PRIMER COMPOSITION TO ACCOMPLISH SAME

[75] Inventors: Donald G. LeGrand, Burnt Hills; William V. Olszewski, Stillwater, both of N.Y.

[73] Assignee: General Electric Company, Pittsfield, Mass.

[21] Appl. No.: 639,710

[22] Filed: Aug. 13, 1984

[51] Int. Cl.[4] ................................................. C09J 5/00
[52] U.S. Cl. ...................................... 156/329; 156/99; 156/313; 427/412.1; 428/412; 524/390
[58] Field of Search .......................... 156/99, 313, 329; 428/412; 427/412.1; 524/390

[56] References Cited

U.S. PATENT DOCUMENTS

| | | | |
|---|---|---|---|
| 2,999,835 | 9/1961 | Goldberg | 156/329 |
| 2,999,845 | 9/1961 | Goldberg | 156/329 |
| 3,666,614 | 5/1972 | Snedeker et al. | 161/183 |
| 4,027,072 | 5/1977 | Molari | 428/412 |
| 4,040,882 | 8/1977 | LeGrand | 156/106 |
| 4,126,730 | 11/1978 | Molari | 428/412 |
| 4,169,181 | 9/1979 | Molari | 428/217 |
| 4,204,025 | 5/1980 | LeGrand et al. | 428/409 |
| 4,204,026 | 5/1980 | LeGrand et al. | 428/409 |
| 4,230,769 | 10/1980 | Goossens | 156/329 |

FOREIGN PATENT DOCUMENTS

| | | | |
|---|---|---|---|
| 55-158965 | 12/1980 | Japan | 428/412 |

*Primary Examiner*—John J. Gallagher
*Attorney, Agent, or Firm*—John W. Harbour; William F. Mufatti; Edward K. Welch, II

[57] ABSTRACT

The present invention provides a method and primer composition to increase the adherence of a polydiorganosiloxane-polycarbonate block copolymer lamina or layer to adjoining thermoplastic laminae or layers in a consolidated laminate or composite.

2 Claims, No Drawings

METHOD FOR INCREASING THE ADHESION OF POLYDIORGANOSILOXANE-POLYCARBONATE BLOCK COPOLYMER INTERLAYERS TO ADJOINING LAMINAE AND PRIMER COMPOSITION TO ACCOMPLISH SAME

This invention relates to adhesion in laminates or multi-layer composites having at least one lamina or adhesive interlayer of a polydiorganosiloxane-polycarbonate block copolymer in face-to-face contact with at least one lamina or layer of a thermoplastic material. More particularly, this invention relates to a method for increasing the adhesion of a polydiorganosiloxane-polycarbonate block copolymer adhesive interlayer to adjoining thermoplastic laminae or layers and the primer composition necessary to accomplish the same.

BACKGROUND

Block copolymers of polydiorganosiloxane and polycarbonate in the form of film or sheet or as a layer from solution have been used in laminates particularly in conjunction with polycarbonate laminae. These block copolymers not only act as an adhesive interlayer joining two laminae but in effect enter into and enhance the laminate structure as a lamina, providing improved strength and ductility over an extremely wide range of temperatures. These physical characteristics, accompanied over a wide range of temperatures by salutary weather resistance and optical clarity, make laminates containing laminae of these block copolymers particularly useful in so-called safety glazing applications where resistance to penetration and spalling from the impact of flying objects such as bullets, rocks, missiles, and the like is desirable.

As with all laminates, the stability and useability of laminates containing polydiorganosiloxane-polycarbonate block copolymer laminae depend upon a variety of intrinsic and extrinsic factors. These factors include adhesion, residual stresses, processing parameters, and the environment in which they are used.

With respect to adhesion, a variety of methods for cleaning or activating the surface of laminae before consolidating the laminate have been used. For example, such methods may employ chemical priming agents, a corona treatment, and others.

The level of the art is now such that depending on the composition of the adhesive interlayer, specific surface treatments are recommended for cleaning, priming, or activating the surface of thermoplastic laminae such as laminae of polycarbonate, polyacrylate, or polystyrene. Rules of thumb and general bonding principles no longer provide the most desirable surface treatment methods nor the best adhesion in a growing number of specific instances.

U.S. Pat. No. 4,169,181 assigned to the same assignee as the present invention discloses an impact resistant laminate having amongst its laminae an adhesive interlayer of a polydiorganosiloxane-polycarbonate block copolymer adhered to a lamina of polycarbonate. The bonding process does not include the use of a primer composition or special surface treatment. Thus, the level of adhesion between the polydiorganosiloxane-polycarbonate block copolymer and polycarbonate laminae is nonuniform across the surface of the bond sometimes resulting in delamination.

U.S. Pat. Nos. 4,027,072 and 4,040,882 assigned to the same assignee as the present invention discloses laminates containing laminae of polysiloxane-polycarbonate block copolymer adhered to a lamina of glass or polycarbonate. In order to enhance the adhesion of the polydiorganosiloxane-polycarbonate block copolymer to the glass or polycarbonate the glass or polycarbonate surface is primed with a solution containing alpha-amino propyltriethoxysilane before consolidation of the laminate. Adhesion is improved by the application of the primer but even greater adhesion is desirable.

U.S. Pat. No. 4,204,026 assigned to the same assignee as the present invention discloses a laminate having an aminoalkyl [poly(aryloxysiloxane)] primer deposited on a lamina of glass to which an adhesive interlayer of polydiorganosiloxane-polycarbonate block copolymer is adhered. This primer is to enhance the adhesion of the polydiorganosiloxane-polycarbonate block copolymer to glass. This primer is not disclosed as suitable to enhance the adhesion of a polydiorganosiloxane-polycarbonate block copolymer laminae to a polycarbonate laminae.

U.S. Pat. No. 3,666,614 discloses the use of a primer composition containing a silane and a solvent system to increase adhesion between an ethylene-vinyl acetate copolymer adhesive interlayer and polycarbonate or glass. Further, U.S. Pat. No. 4,126,730 assigned to the same assignee as the present invention discloses this primer to be suitable for use as an adhesion promoter between a polydiorganosiloxane-polycarbonate block copolymer lamina and a polycarbonate lamina. The silanes are preferred for use where one of the lamina to be bonded is glass.

Thus, while laminae of polydiorganosiloxane-polycarbonate block copolymers are frequently bonded with satisfactory results to thermoplastic laminae and polycarbonate, there exists a need for a primer composition to increase the adhesion between the two laminae and to increase the uniformity of the resulting bond strength across the face of the bond. Furthermore, while such primers have been proposed in the past, none has proven completely satisfactory in increasing the strength and consistency of adhesion of polydiorganosiloxane-polycarbonate block copolymer laminae to thermoplastic laminae and particularly to laminae of polycarbonate.

Therefore, it is an object of the present invention to increase the adherence of a polydiorganosiloxane-polycarbonate block copolymer lamina or adhesive interlayer to an adjoining thermoplastic lamina or layer.

It is another object of the present invention to provide a method for bonding a polydiorganosiloxane-polycarbonate block copolymer lamina or layer to a thermoplastic lamina or layer and thereby produce a laminate or multi-ply composite of at least two plies.

DESCRIPTION OF THE INVENTION

It has been found that primer compositions containing polydiorganosiloxane-polycarbonate block copolymers, certain alkanols, certain halogenated hydrocarbons, in certain proportions provide for markedly increased adhesion of a polydiorganosiloxane-polycarbonate block copolymer lamina or layer to an adjoining thermoplastic lamina or layer. Particularly, preferred adjoining thermoplastic laminae or layers of the present invention are the polycarbonate resins, polyacrylate resins, or polystyrene.

Any of the usual polycarbonate resins can be used as adjoining thermoplastic laminae for the present invention including but not limited to those described in U.S.

Pat. Nos. 3,161,615; 3,220,973; 3,312,659; 3,312,660; 3,313,777; 3,666,614, among others, all of which are included herein by reference.

Likewise, any of the usual acrylic or methacrylic resins can be used as laminae or layers in the present invention. The term "acrylic resin" is herein meant to embrace within its scope those polymers or resins resulting from the polymerization of one or more acrylates such as, for example, methyl acrylate, ethyl acrylate, butyl acrylate, 2-ethylhexyl acrylate, etc., as well as the methacrylates such as, for instance, methyl methacrylate, ethyl methacrylate, butyl methacrylate, hexyl methacrylate, etc. Copolymers of the above acrylate and methacrylate monomers with lesser molar proportions of, for example, ethylene, acrylonitrile, butadiene, etc., are also included within the term acrylic resin as well as the cross-linked acrylates and methacrylates. The polymerization of the monomeric acrylates and methacrylates to provide the polyacrylate resins useful in the practice of the invention may be accomplished by any of the well known polymerization techniques. A preferred acrylic resin is poly(methylmethacrylate).

Other suitable thermoplastic materials which may be used include ABS plastics based on combining acrylonitrile, butadiene and styrene; acetal homopolymers; acetal copolymers produced by polymerization of trioxane and ethylene oxide; acrylics; epoxy resins; nylons, those prepared from a diamine and a diacid and those prepared from an amino acid or an aminoacid derivative; phenolics; polycarbonates; phenylene oxide based resins such as polyphenylene oxide and blends of polyphenylene oxide and styrene resins; polyaryl ethers; polyesters; polyethylenes; polyphenylene sulfides; polypropylene; polysulfones; polyurethanes; silicones; ethylene polymers such as ethyl vinyl acetates; conductive plastics; and ordered aromatic copolymers, etc. These solid resinous materials can be formed into sheets.

The polydiorganosiloxane-polycarbonate block copolymers of both the primer composition and the block copolymer lamina or layer can be expressed by the average formula

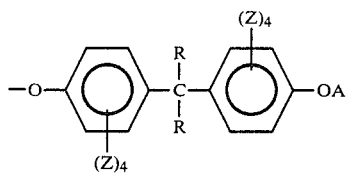

A is a member selected from the class of hydrogen and

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R" is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals, preferably $C_{(1-8)}$ radicals, represented by R of Formula 1 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned R radicals except hydrogen, and R' is preferably methyl. R' also includes in addition to all the radicals included by R, except hydrogen, cyanoalkyl radicals such as cyanoethyl, cyanobutyl, etc. radicals. Radicals that are included within the definition of Z of Formula 1 are hydrogen, methyl, ethyl, propyl, chloro, bromo, iodo, etc. and combina-

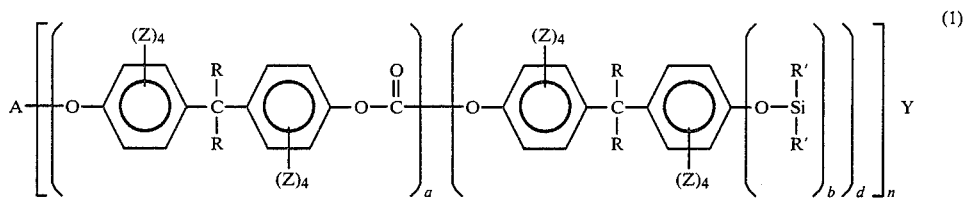

where n is at least 1, and preferably n is an integer equal to from 1 to about 1000, inclusive, a is equal to from 1 to about 200, inclusive, b is equal to from about 5 to about 200, inclusive, and preferably b has an average value from about 15 to about 90, inclusive, while the ratio of a to b can vary from about 0.05 to about 3, inclusive, and when b has an average value of from about 15 to about 90, inclusive, the ratio of a to b is preferably from about 0.067 to about 0.45, inclusive, and d is 1 or more, Y is tions thereof and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and a precursor of carbonate acid, where each of said recurring copolymeric units comprises by average weight from about 10% to about 75% of said polydiorganosiloxane, and preferably from about 40 to 70% by weight.

The copolymers of Formula 1 can be produced by reacting at temperatures in the range of 0° C. to 100° C., preferably, 20° C. to 50° C., and in the presence of an acid acceptor, a mixture of halogen chain-stopped polydiorganosiloxane having the formula

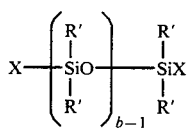

and a dihydric phenol having the formula

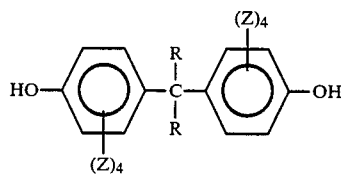

and thereafter phosgenating said reaction product until the resulting copolymer achieves a maximum intrinsic viscosity, where R, R', Z and b are as defined above, and X is a halogen radical, preferably chloro.

The halogen chain-stopped polydiorganosiloxanes of Formula 4 can be made by conventional procedures such as by the controlled hydrolysis of a diorganodihalosilane, for example, dimethyldichlorosilane as taught in Patnode, U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35% by weight, and preferably from about 1 to about 10% by weight of said halogen chain-stopped polysiloxane. The halogen chain-stopped polysiloxane is preferably in the form of a chlorinated polydimethylsiloxane.

Dihydric phenols that are included in Formula 5 are, for example, 2,2-bis(4-hydroxyphenyl)-propane, (bisphenol-A); 2,4'-dihydroxydiphenylmethane; bis-(2-hydroxyphenyl)-methane; bis-(4-hydroxyphenyl)-methane; 1,1-bis-(4-hydroxyphenyl)-ethane; 1,2-bis-(4-hydroxyphenyl)-ethane; 1,1-bis-(4-hydroxy-2-chlorophenyl)-ethane; 1,3-bis-(3-methyl-4-hydroxyphenyl)-propane; 2,2-bis-(3-isopropyl-4-hydroxyphenyl)-propane, etc. Mixtures can also be used. Others will occur to those skilled in the art.

The copolymers of the present invention essentially comprise recurring units consisting of a polydiorganosiloxane interconnected by substituted aryloxy-silicon linkages to a polyester of carbonic acid precursor and a dihydric phenol.

Materials of the above nature are also described in U.S. Pat. No. 3,189,662 included herein by reference and can be used either alone as such or in conjunction with well known modifiers to provide particular described characteristics.

Illustrative of the block copolymer solid interlayers is General Electric LR-3320. This material has a specific gravity of 1.12, a tensile strength of 2500 to 3900 psi, an elongation of 230 to 430, a tear strength (Die C) of 400 lbs./in., and a brittleness temperature below −76° F. and a heat deflection temperature (10 mils under 66 psi Load) of 160° F.

Another such block copolymer solid interlayer, specifically General Electric LR-5530, has a specific gravity of 1.07, a tensile strength of 2200 to 2500 psi, an elongation of 500–700 T, a tear (Die C) of 200 lbs./in., and a brittleness temperature below −76° F. and a heat deflection temperature (66 psi) of 130° F.

The primer composition of the present invention contains the above described block copolymers dissolved in a solvent system. The primer composition is preferably prepared by dissolving the block copolymer in a $C_{(1-6)}$ halogenated alkyl or $C_{(6-9)}$ halogenated phenyl and adding a $C_{(3-6)}$ alkanol such as, for example, n-butanol in any amount up to but excluding the amount where precipitation of the block copolymer from solution is observed. In the case where the addition of even small amounts of n-butanol results in precipitation of the block copolymer then the ratio of the $C_{(1-6)}$ halogenated alkyl or $C_{(6-9)}$ halogenated phenyl to the block copolymer should be increased. Alternatively, the primer composition may be prepared by forming an emulsion of the block copolymer in the above alkanol and adding halogenated alkyl or phenyl until or to a point after a clear solution is obtained. A preferred primer composition will contain by weight from about 1–5% of the block copolymer, from about 5–15% the alkanol, and the balance, the halogenated alkyl or phenyl. A preferred halogenated alkyl or phenyl is methyl chloride, and a preferred alkanol is n-butanol.

The function of the primer composition is to increase adhesion between a polydiorganosiloxane-polycarbonate block copolymer lamina or layer and a thermoplastic lamina or layer. To perform this function, a thin film of the primer composition is applied by any of the well known means to the contact surface of the thermoplastic lamina or layer, the solvent of the primer composition is evaporated, the laminae or layers are laid-up or positioned so that the surfaces to be joined are aligned, and the laminae or layers are bonded by any of the well known means, usually by the application of both heat and pressure such as by use of lamination press techniques or vacuum lamination procedures. Preferably, the thin film referred to above is of sufficient thickness to provide from about 0.10 g/cm² to about 0.01 g/cm² of the polydiorganosiloxane-polycarbonate block copolymer on the thermoplastic surface.

The term laying-up may be construed as a term not only applying to batch laminates, but herein it is intended to have a broader meaning which encompasses positioning or aligning, as for example a flexible sheet which is aligned above a substrate to which it is being continuous roll pressed is "laid-up" within the meaning of the term for the present invention.

So that those skilled in the art may better understand the scope of the present invention, the following examples are offered by way of explanation and not for the purpose of limitation.

EXAMPLE 1

Examples 1–3 are not within the present invention. An extruded ¼ inch thick sheet of LEXAN ® ( ® Registered Trademark of General Electric Company) resin polycarbonate sheet made by General Electric Company, was dried in an oven at 125° C. for eight hours. After cooling to room temperature, the sheet was wiped with methylene chloride. Subsequently, a 30 mil sheet of LR 3320 was laminated to the wiped surface at 100 psi and 130° C. The peel 90° strength was found to be between 17 and 21 lbs/inch.

EXAMPLE 2

A 1% solution of LR 3320 as described above in methylene chloride was used with a doctor blade to deposit a film approximately 1 mil thick on the surface of dry ¼ inch LEXAN resin sheet, as described in Example 1. During the course of evaporation of the solvent, bubbles were observed to form on the surface of the LEXAN resin sheet and subsequently a turbidity developed. Subsequent lamination of the thus coated LEXAN resin sheet with a 30 mil sheet of LR 3320 resulted in a significant reduction in the bubbles and turbidity, but more significantly the 90° peel strength was found to be between 40 and 50 lbs/inch.

EXAMPLE 3

In order to minimize bubble formation and turbidity, 5% ethylene glycol monomethyl ether was added to some of the LR 3320 solution described in Example 2. A thin film of this solution was deposited on polycarbonate sheet as described in Example 2. After air drying, the film was more turbid than that described in Example 2 and the 90° peel strength was between 17 and 20 lbs/inch.

EXAMPLE 4

Examples 4-5 demonstrate the present invention. n-butanol was substituted for ethylene glycol monomethyl ether described in Example 3. The solution was then cast onto a piece of LEXAN as described in Example 2. The resultant film was free of bubbles and non-turbid. The 90° peel strength of LR 3320 to this substrate was determined to be between 40–50 lbs/inch as in Example 2.

EXAMPLE 5

The concentration of butanol was increased to 10% and the same procedure as in Example 4 was used. The results were the same as in Example 4.

EXAMPLE 6

Example 6 is not within the present invention. The concentration of butanol was increased to 30% and the same procedure as in Example 4 was followed. In contrast to Examples 4 and 5, an extremely turbid film resulted and the adhesion was very poor and erratic.

While there have been described what are considered to be the preferred embodiments of this invention, it will be understood that the practice of this invention is not limited to the resins and coatings described in the specific examples but that various modifications may be made therein without departing from the scope of the invention as it is defined in the appended claims.

What is claimed is:

1. A method for increasing the adhesion of a polydiorganosiloxane-polycarbonate block copolymer lamina or layer to a polycarbonate lamina or layer comprising the steps of:
   (a) applying to at least one side of said polycarbonate lamina or layer a primer composition comprising a solution of a polydiorganosiloxane-polycarbonate block copolymer in an organic solvent comprising a $C_{(3-6)}$ alkanol mixed with either a $C_{(1-6)}$ halogenated alkyl or a $C_{(6-9)}$ halogenated phenyl;
   (b) evaporating said solvent;
   (c) laying-up said polydiorganosiloxane-polycarbonate block copolymer lamina or layer relative to said coated face of said polycarbonate lamina or layer; and
   (d) bonding said laid-up laminae or layers to produce a multi-ply composite or laminate.

2. The method according to claim 1 wherein said application step has the further limitation that said primer composition be applied in an amount necessary to provide from about 0.01 g/cm$^2$ to about 0.10 g/cm$^2$ of said polydiorganosiloxane-polycarbonate block copolymer to said at least one side.

* * * * *